United States Patent

Smith, Jr.

[11] Patent Number: 5,508,930
[45] Date of Patent: Apr. 16, 1996

[54] VEHICLE NAVIGATION APPARATUS WITH NEW ROUTE REPLANNING APPARATUS

[75] Inventor: Bernard C. Smith, Jr., Crystal Lake, Ill.

[73] Assignee: Motorola, Inc., Schaumburg, Ill.

[21] Appl. No.: 364,836

[22] Filed: Dec. 27, 1994

Related U.S. Application Data

[63] Continuation of Ser. No. 812,661, Dec. 23, 1991, abandoned.

[51] Int. Cl.$^6$ .................................................. G06F 165/00
[52] U.S. Cl. .................... 364/444; 364/449; 73/178 R; 340/988
[58] Field of Search ........................................ 364/443, 444, 364/445, 449; 340/988, 989, 990–995; 73/178 R

[56] References Cited

U.S. PATENT DOCUMENTS

| | | | |
|---|---|---|---|
| 4,350,970 | 9/1982 | von Tomkewitsch | 340/989 |
| 4,558,418 | 12/1985 | Keearns | 364/444 X |
| 4,825,055 | 4/1989 | Pollock | 364/449 X |
| 5,031,104 | 7/1991 | Ikeda et al. | 364/449 |
| 5,177,685 | 1/1993 | Davis et al. | 364/443 |
| 5,184,303 | 2/1993 | Link | 364/449 |
| 5,220,507 | 6/1993 | Kirson | 364/444 |
| 5,243,528 | 9/1993 | Lefebvre | 364/449 |
| 5,323,321 | 6/1994 | Smith, Jr. | 364/449 |

OTHER PUBLICATIONS

M. L. G. Thoone, *Philips Technical Review*, vol. 43, No. 11/12, "CARIN, a car information and navigation system", Dec. 1987, pp. 317–329.

James R. Davis, "Back Seat Driver: voice assisted automobile navigation", Massachusetts Institute of Technology, Sep. 1989.

*Primary Examiner*—Collin W. Park
*Attorney, Agent, or Firm*—Phillip H. Melamed

[57] ABSTRACT

Vehicle navigation apparatus (10) calculates an initial route to a destination (52) via connected road segments (55, 59) defined in a road map data base. In response to a can't do-reroute signal, indicative of the vehicle user determining unsuitability of following the initial route guidance instructions, a new route (55, 60, 61, 62, 59) to the destination is provided. Automatically excluded from the new route is a maneuver (ordered road segment pair (55–59)) and/or a road segment of the initial route. This prevents the new route from including an initial guidance instruction which was determined as unsuitable. Also, calculated routes are provided by calculating the route from a predicated position of the vehicle at a subsequent time based on the vehicle's current position, direction and rate of travel. This ensures that when the route is provided at the subsequent time, the vehicle will not have passed the first maneuver to be implemented in the calculated route.

17 Claims, 4 Drawing Sheets

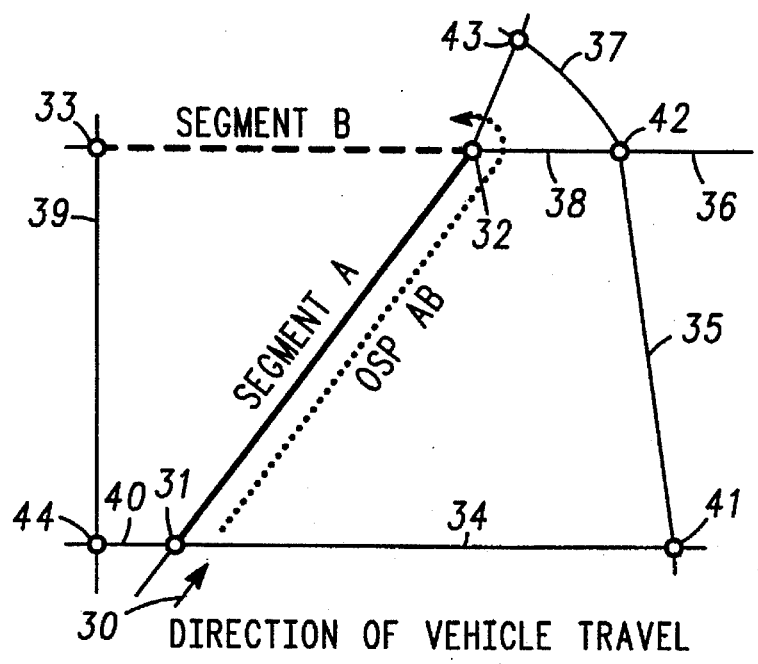
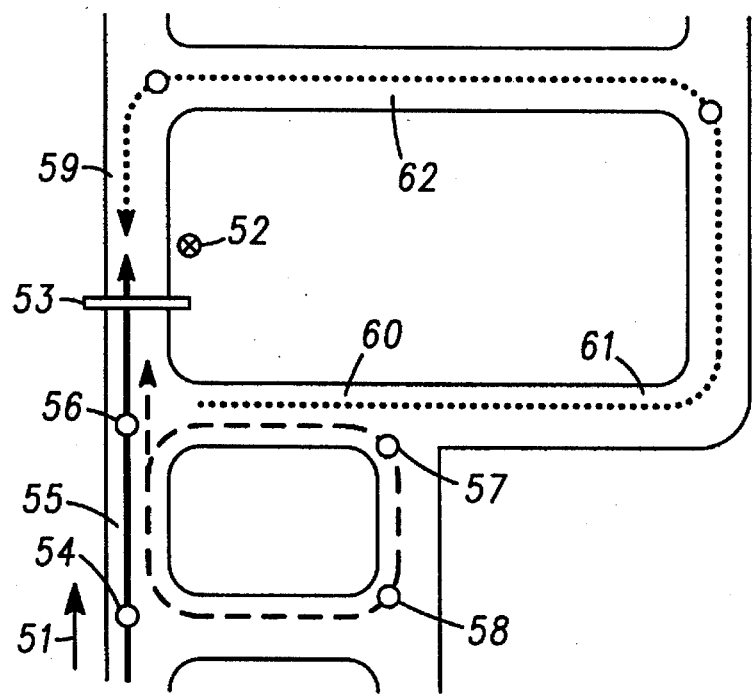
FIG. 4

VEHICLE NAVIGATION APPARATUS WITH NEW ROUTE REPLANNING APPARATUS

This is a continuation of application Ser. No. 07/812,661, filed Dec. 23, 1991 and now abandoned.

FIELD OF THE INVENTION

The present invention relates to the field of vehicle navigation apparatus which calculate routes to desired destinations. More specifically, the present invention relates to such vehicle navigation route planning devices in which the planned route comprises an ordered connected plurality of road segments selected from road segments defined in a road map data base.

BACKGROUND OF THE INVENTION

Vehicle navigation systems exist in which data concerning road segments in a geographical area is stored in a memory device as a road map data base. A navigation computer then calculates a desired route between a current specified position of a vehicle and a desired destination. This route comprises an ordered connected plurality of road segments selected from the road segments in the road map data base. These vehicle navigation systems then provide guidance instructions to the vehicle user to enable the vehicle to traverse the desired route by implementing maneuvers at the junctions, or nodes or intersections, at which the various road segments are connected. Typically, the route is calculated starting from the vehicle's current position.

In navigation systems such as those described above, sometimes it may not be possible or desirable to follow the guidance instructions for traversing the desired route. Sometimes, there is a road blockage which prevents travel on a specified road segment. Other times there are errors in the road map data base which result in the guidance instructions requiring the vehicle to turn onto nonexistent roads or to turn the wrong way down a one-way street. What typically happens in such situations is that the vehicle will go off route and some sort of route recovery is implemented.

In one prior system, such as the Philips "Carin" system, when the vehicle goes off route the system will automatically calculate a new route to the desired destination. This type of recovery is perfectly satisfactory if the reason the vehicle went off route was simply because the vehicle driver failed to implement a desired maneuver and there was no permanent restriction preventing the implementing of such a maneuver. However, if the reason that the vehicle went off route was because the guidance instruction would have instructed the vehicle to turn the wrong way down a one-way street or turn onto a road segment which had a permanent or relatively permanent blockage of traffic, it is quite likely that such prior navigation systems will merely reroute the vehicle such that the vehicle driver will again be instructed to implement the same undesirable maneuver. In other words, the prior automatic reroute navigation systems have no way of determining if the reason that a desired maneuver was not implemented was because of some actual undesirability of implementing the maneuver or if the maneuver was just not implemented because of a very transient type situation, such as the momentary inattentiveness of the driver or the fact that the driver happened to be in the wrong lane for making a desired turn maneuver. The end result is that prior automatic reroute systems may continually route the vehicle back to the same maneuver or obstruction.

Some prior navigation systems allow a vehicle operator to implement a new route to the same destination while the operator specifies the exclusion of particular road segments. This essentially corresponds to calculating an entire new route where the vehicle driver has to specifically identify by name or by location roads or road segments that are to be avoided and not made part of the new route. While many such prior navigation systems exist, the requirement that the vehicle operator specifically identify what road segments are to be excluded from a new route means that the route planning process is now substantially longer and more complicated. When a vehicle driver is already driving towards a desired destination on an initial route, requiring the vehicle operator to plan an entire new route by inputing to the navigation computer specifics as to what roads or road segments are to be avoided in a new route is not desirable. If the driver does not exclude some road segment or maneuver from the new route to be calculated, the new route may include the same problem that existed in the original route.

In prior vehicle navigation systems, routes are calculated based on the vehicle's current position and the position of the desired destination. However, if the vehicle is moving, an optimum route might not be selected because when the route is actually provided by the navigation computer at a subsequent time the vehicle's then current position may not correspond to the vehicle location for which the optimum route has been calculated. Thus, for example, a route may be provided which requires a turn onto a road segment which the vehicle may have just passed because the vehicle was moving at a substantial rate of speed when a command for a new route was generated and because the navigation computer required an appreciable time to calculate the new route. Thus while a new route has been provided, implementing this new route may be difficult if the vehicle was moving and an appreciable time is required for the computer to generate the new route. Current navigation computers do require a substantial calculation time due to the large number of road segments which may be involved in plotting a route. This type of deficiency apparently has not been considered by prior navigation systems.

SUMMARY OF THE INVENTION

In one embodiment of the present invention a vehicle navigation apparatus is provided. The apparatus comprises means for calculating for a vehicle an initial route to a desired destination. This initial route comprises an ordered connected plurality of road segments which are selected from road segments defined in a road map data base. The road segments of the initial route are ordered so as to define a plurality of vehicle maneuvers for traveling from one road segment in said initial route to a connected road segment in said route. Guidance means then provides sequential initial route guidance instructions in accordance with the initial route to enable the vehicle to traverse the initial route. The navigation apparatus includes means for providing a user initiated can't do-reroute signal indicative of a vehicle user determining unsuitability of following the initial route guidance instructions. In response to the can't do-reroute signal, new route means will automatically identify for exclusion at least one of the maneuvers between road segments of the initial route, and then calculate a new route to the destination which excludes the at least one identified maneuver. Guidance means then provides new route guidance instructions to enable the vehicle to traverse the new route to the destination.

As stated above, the new route means excludes a maneuver between road segments in the initial route in response to the creation of the user determined can't do-reroute signal. While defined in terms of maneuvers, the same principle can be restated in terms of excluding an "ordered road segment pair" (OSP), wherein the term ordered road segment pair is defined as a specific combination of two connected, adjacent, road segments taken in a specific order. The ordered road segment pair thereby defines a maneuver for traveling from one road segment to another. Similarly, the same principle can be applied to excluding a next specific road segment of the initial route instead of a maneuver or ordered road segment pair. In each instance, the new route means automatically responds to the can't do-reroute signal by identifying what part of the initial route is to be excluded and then excluding this part from the calculated new route to the same destination.

An additional feature of the present embodiment involves calculating a route to a destination by providing the calculated route at a subsequent time and calculating the route starting from a predicted vehicle position at the subsequent time based on the vehicle's current position, direction and rate of travel. According to this feature of the present embodiment the calculated route is more likely to be achievable because the route will start at the vehicle's predicted position rather than the position of the vehicle at the time that the route calculations were started.

One advantage of the present embodiment as described above is that the new route means will automatically identify what portions of the initial route are to be excluded from the new route to be planned. This prevents the new route from attempting to route the vehicle through the same maneuver, or road segment, which the vehicle user has determined as being unsuitable by his generation of the can't do-reroute signal. Another advantage is that an optimum route is more readily obtainable since the route is based on the vehicle's predicted position when the route calculations are completed.

BRIEF DESCRIPTION OF THE DRAWINGS

The present invention can be better understood by reference to the drawings, in which:

FIG. 3 comprises a graphic representation of road segments which may form a calculated route in accordance with the present invention;

FIG. 4 is a graphic representation of a road segment pattern which illustrates the operation of the apparatus shown in FIG. 1 as compared to prior navigation apparatus;

DESCRIPTION OF THE PREFERRED EMBODIMENTS

Figure 1:
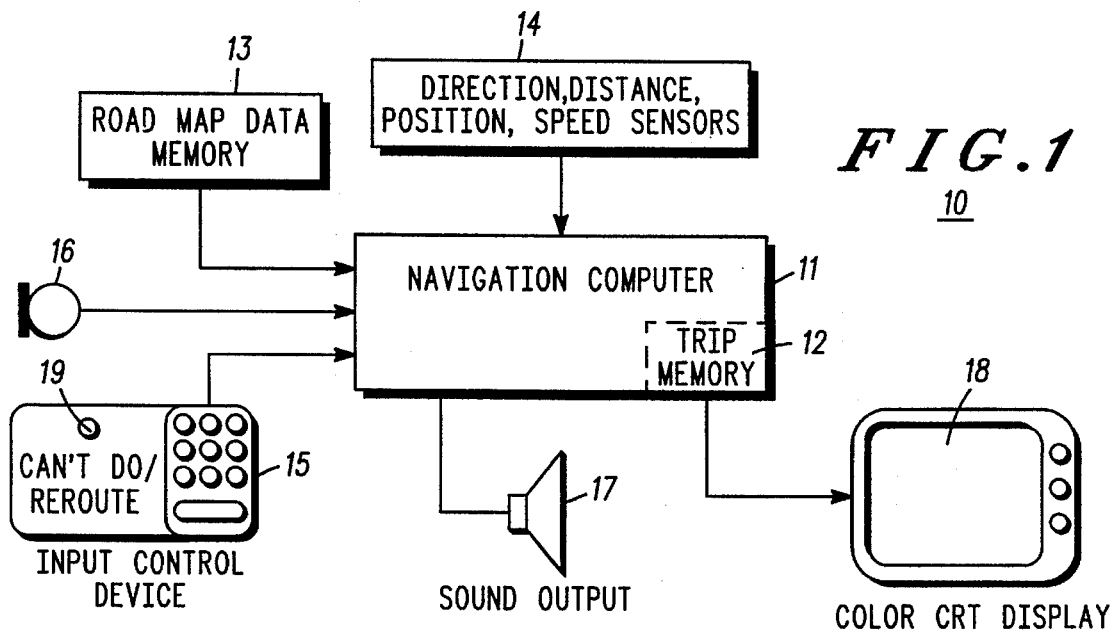
FIG. 1 is a schematic diagram of a vehicle navigation apparatus constructed in accordance with the present invention.

Referring to FIG. 1, a vehicle navigation apparatus 10 is illustrated. The apparatus includes a navigation/trip computer 11 which includes a trip memory portion 12. The computer 11 receives road segment data from a road map data base stored in a road map data memory device 13 which can comprise the memory portion of a compact disc (CD) device. In addition, the computer 11 receives vehicle direction, distance, position and speed information from vehicle direction, distance, position and speed sensors 14 indicated in block diagram form in FIG. 1. Input commands to the navigation computer 11 are provided by an input control device 15 and a microphone transducer 16. An audible output derived from the navigation computer is provided by a sound output device speaker 17, and a visual output derived from the computer 11 is provided by a color CRT display 18.

Essentially, the navigation computer 11 is mounted in a vehicle. The computer receives information as to the orientation, speed and present position of the vehicle from the sensors 14. It receives road segment data from the road map memory device 13. In response to commands provided by the input control device 15 and/or microphone transducer 16, the navigation computer 11 will calculate a desired navigation route to a desired destination specified by the vehicle driver. Subsequently, the navigation computer will provide sequential route guidance instructions to the vehicle driver to enable the vehicle to traverse the calculated route to the destination.

The input control device 15 and microphone 16 are utilized by the vehicle driver to provide various command information to the navigation computer, including specifying the location of the desired destination as well as designating any route preference or trip detour data. Route preference data comprises the vehicle driver's preference for certain types of roads as opposed to other types of roads. For example, the driver may wish to avoid expressways or may wish to use expressways whenever possible. In addition, the driver may want to initially specify which roads should be totally avoided because he knows of congestion problems which may occur on such roads. To input this information to the computer, the control device 15 essentially comprises a keyboard as shown in FIG. 1. Alternatively, the microphone 16 may transmit this information to the computer by means of voice recognition circuitry contained within the computer. A manual can't do-reroute push button 19 is provided as part of the input control device 15. The significance of this push button will be subsequently described.

Figure 2:
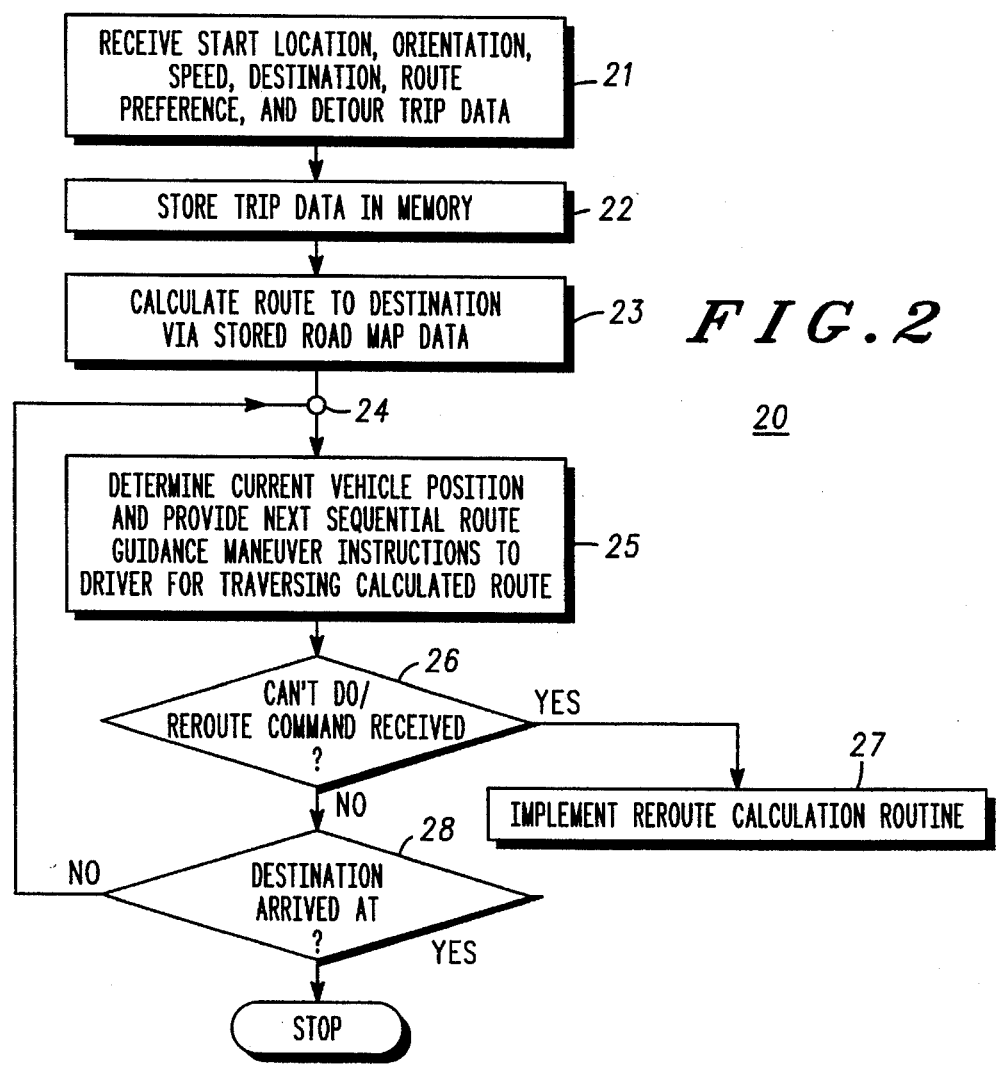
FIG. 2 is a flowchart which illustrates the general operation of the apparatus shown in FIG. 1.

The basic operation of the navigation apparatus 10 corresponds to the flowchart 20 illustrated in FIG. 2. The flowchart 20 represents the manner in which the programming of the computer 11 responds to specific inputs and provides desired results.

Referring now to FIG. 2, the flowchart 20 is entered at an initial process block 21 during which the computer 11 will receive the vehicle start location, the desired destination location, vehicle orientation and current speed data, and any route preference and detour route data specified by the driver. The vehicle start location is determined by the direction, distance, position and speed sensors 14 in the FIG. 1 block 14 which may include a GPS receiver. Alternatively, the vehicle start location can also be specified by the vehicle driver through his utilization of the input control device 15, and its keyboard, provided that the vehicle driver knows the current location of the vehicle.

The data received via process block 21 is stored via process block 22 in the trip memory location 12 of the navigation computer 11. Subsequently, via a process block 23, the navigation computer 11 will calculate a desired route to the specified destination via the stored road map data comprising the road segments defined in the road map data base provided in the memory device 13. Preferably the memory device 13 comprises a compact disc (CD) reader in which road segment data is stored on a compact disc and then read into a memory storage device in the reader which is provided as an input to the navigation computer 11. Many prior systems contemplate the providing of such stored road map data to a navigation computer.

The manner in which the navigation computer 11 calculates, per process block 23, a route to the desired destination from some start position via the stored road map data is not significant and many such prior route calculation apparatus exist. The computer can select the desired route such that an optimum route for minimum time or minimum distance is provided. The end result is that the computer 11 will select some of the road segments stored in the memory device 13 and provide a desired route comprising a sequential ordered connected plurality of road segments which extend between the present vehicle location and the desired destination. Motorola U.S. Pat. No. 5,220,507, issued Jun. 15, 1993, to Allan Kirson describes an implementation for a navigation computer in which several desired routes to a specific destination can be implemented by a navigation computer.

From process block 23, control passes to a terminal 24 and then onto a process block 25 during which the computer 11 determines the current position of the vehicle and the computer 11 then provides sequential route guidance maneuver instructions to the vehicle driver for traversing the calculated route. Many such prior systems exist wherein such maneuver guidance instructions are provided in audible and/or visual form. The navigation apparatus 10 in FIG. 1 illustrates a speaker 17 and visual display 18 so as to provide both types of guidance instructions to the vehicle operator. Preferably the CRT display 18 will provide visual turn indications whenever a turn maneuver is desired, while the speaker 17 will simultaneously provide audible turn instructions for any turns to be implemented.

After the process block 25, control passes to a decision block 26 which determines if a "can't do/reroute" command has been received by the computer 11. This can't do/reroute command can be initiated by the vehicle driver by manual actuation of the can't do/reroute push button 19. This manual actuation can comprise just a single manual actuation. Multiple manual actuations of the push button 19 may be used to create, if desired, a series of different types of can't do/reroute commands being provided to the navigation computer for recognition. When a "can't do/reroute" command is received, process flow proceeds from the decision block 26 to a process block 27 which comprises a reroute calculation subroutine that will automatically calculate a new route to the desired destination. If no such can't do/reroute command is received, control passes to a decision block 28 which inquires if the destination has been arrived at. If so, then the flowchart 20 stops. However, if the destination has not yet been arrived at, then control passes back to the terminal 24 and then onto the process block 25 wherein the computer 11 will then issue the next sequential route guidance maneuver instruction to the driver.

Basically, the flowchart 20 represents the computer 11, when instructed by the vehicle driver, calculating a route and providing sequential guidance instructions to the driver. These guidance instructions continue until the desired destination is arrived at. Systems such as those generally described in the preceding two sentences are commonplace in the vehicle navigation field. However, such systems have problems when the vehicle deviates from the desired route or when following the desired route is either impossible or inadvisable as determined by the vehicle driver. For instance, if the sequential guidance instructions require a right turn and the driver can see that the road segment onto which he is being directed is under construction or impassable, obviously he will not turn to the right and he would like another route to the destination. Similarly, if the guidance instruction requests the driver to implement a turn and that would result in the vehicle going the wrong way on a one way street, again the driver will not implement this turn, but he still may want a rapid determination of a new route to his destination. In prior systems, the vehicle driver was expected to drive off route in such situations. In some prior systems, when the vehicle does drive off route a new route is automatically calculated to direct the vehicle to the desired destination. However, in such prior systems the new route may include the same impossible or undesirable maneuver or road segment that caused the vehicle to go off route. In such a situation, these prior navigation systems may result in directing the vehicle in a continuous generally circular path by constantly including the undesirable maneuver or road segment in each new route it plans.

Some navigation systems describe another plausible vehicle navigation recovery system for going off route. In those systems when the vehicle goes off route, preferably a visual display of a map network is provided along with indications of the desired route and the vehicle's current travel path. The vehicle driver may then be able to determine, based on this off route visual display, how to reenter the initial route and continue his travel to the desired destination. However sometimes, rather than providing such a visual road map off route recovery display, it may be preferable to provide a different off route recovery mechanism which calculates a new route but avoids the prior art deficiencies discussed in the preceding paragraphs.

Most prior navigation systems allow the vehicle driver to instruct the navigation computer to compute a new route to the destination. In fact, the prior Philips "Carin" system discussed above automatically computes such a new route when the vehicle goes off route with respect to its current planned route. Some prior navigation systems also allow the vehicle driver to specify that in a new route certain road segments should be avoided. This is accomplished by the vehicle driver specifically designating a road segment as a road segment to be excluded from a new route to be calculated. Typically this road segment is identified as a "detour" and then the computer is instructed to provide a new route excluding any detours. However, after the vehicle driver has already embarked on his trip, it is very time consuming, difficult, distracting and annoying for the vehicle driver to identify what road segments which should be excluded from a new route and then provide this information to the navigation computer. The vehicle driver may not be aware of the identity of the road segment(s) to be excluded. Also, having the vehicle operator (driver) specify such exclusion data to the computer while the vehicle driver is driving the vehicle represents a potential hazard because it will distract the driver from his primary driving responsibility.

What is therefore needed is a rerouting system which requires minimal vehicle driver action while still avoiding the circular rerouting problem that may occur with prior automatic vehicle rerouting systems such as the Philips "Carin" system. This is achieved in the navigation apparatus 10 shown in FIG. 1 by the providing of the can't do/reroute button and the providing of the blocks 26 and 27 in the flowchart 20.

Figure 5:
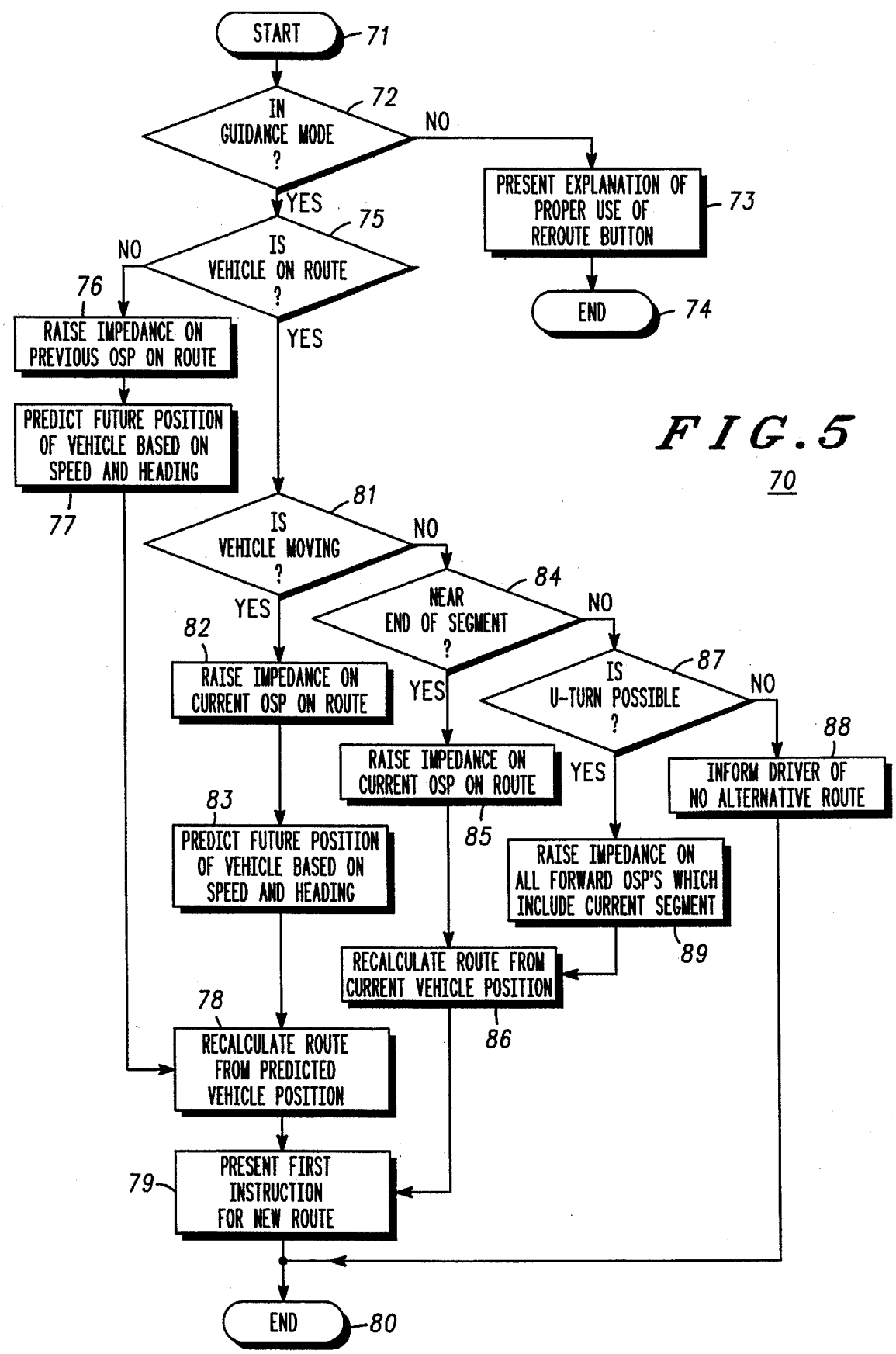
FIG. 5 is a flowchart which corresponds to a reroute calculation routine shown in block form in FIG. 2.
Figure 6:
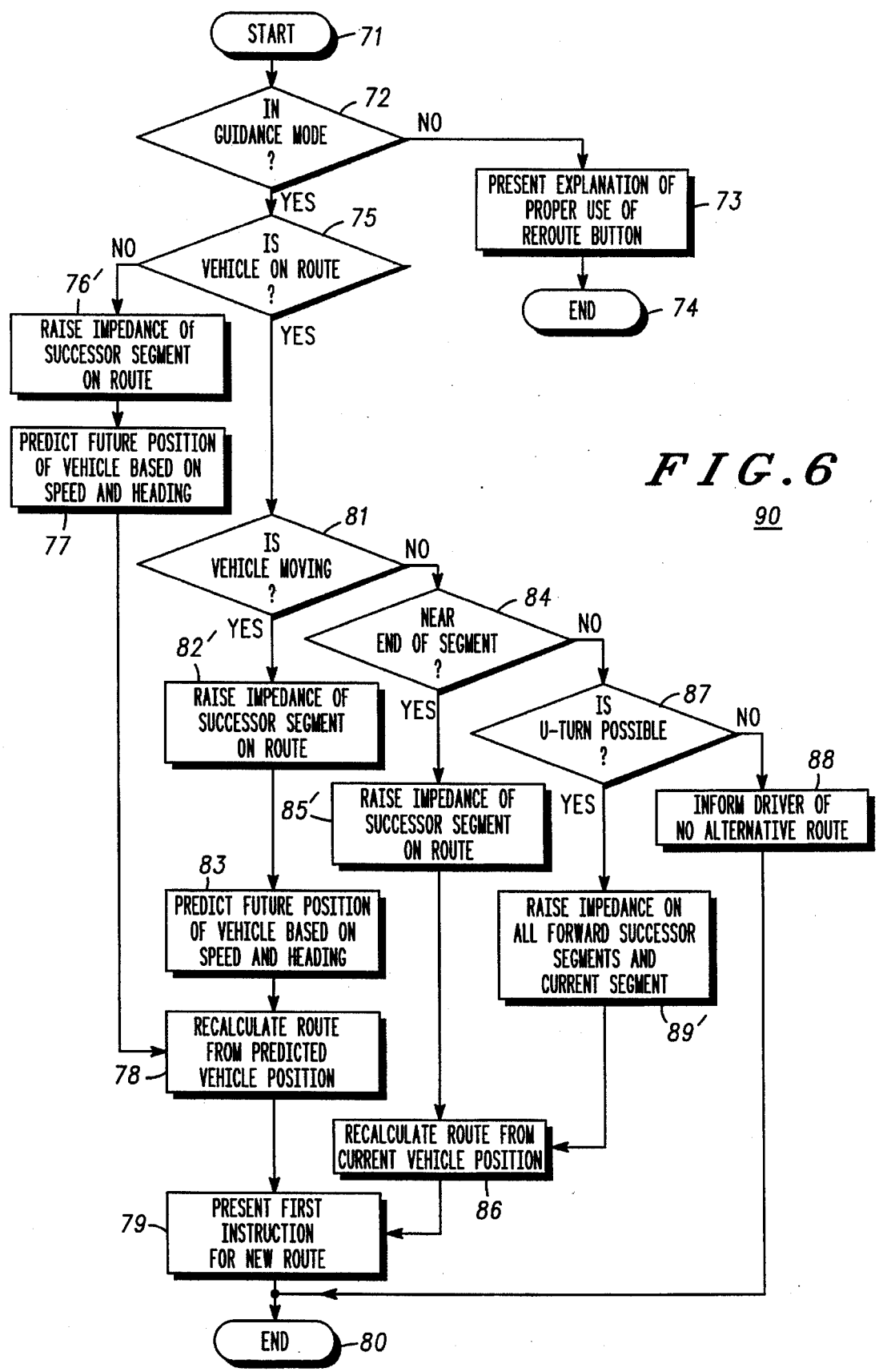
FIG. 6 is an alternative flowchart showing another implementation for the reroute calculation routine shown in FIG. 2.

In addition, prior vehicle navigation systems have calculated routes based on the vehicle's current position when route calculations start. Typically they have not taken into account that the vehicle may be moving such that after the new route is calculated the vehicle will no longer be at the position upon which the new route was based. The end consequence is that potentially the new route may call for an immediate turn maneuver, but the vehicle may have already passed the road segment on to which it is to turn. The navigation apparatus in FIG. 10 avoids this problem by virtue of its use of a predicted position of the vehicle based on the vehicle's current speed and direction of travel. The manner in which this is achieved is discussed more fully in connection with the discussion of the reroute calculation routine implemented by process block 27. However this feature can also apply to the initial route calculated by block 23. FIGS. 5 and 6 illustrate two different alternative flowcharts for implementing the reroute calculation routine 27.

Before preceding with a detailed description of the reroute calculation routine shown in FIGS. 5 and 6, a further explanation of planned routes will be provided in connection with FIGS. 3 and 4. It should be noted that any route planned by the navigation computer 11 comprises an ordered connected plurality of road segments selected from the road segments defined in the road map data base stored in the memory device 13. The computer 11 will access the road segments in memory device 13 and essentially order or sequentially arrange selected road segments as a sequence of "ordered road segment pairs" (OSPs) which define a route. An "ordered road segment pair", as referred to herein, is a specific combination of two connected, adjacent road segments taken in a specific order to define a maneuver so as to travel from one specified road segment to another as part of traversing the road segments in a predetermined route.

Referring to FIG. 3, a portion of a desired route is illustrated along with other road segments which do not form part of the desired route. In FIG. 3, the direction of vehicle travel is indicated by an arrow 30 as the vehicle approaches an intersection or road segment node 31. Between road segment node 31 and a node 32 exists a road segment A which is part of the desired route. Subsequent to road segment A, the desired route consists of a road segment B which exists between node 32 and a node 33. Other road segments which are not part of a desired route are illustrated in FIG. 3 as road segments 34 through 40 and other road segment nodes 41 through 44 are also illustrated.

In FIG. 3, the desired route comprises the ordered road segment pair (OSP) AB which indicates that the desired route is to travel first along road segment A and then along road segment B. The concept of ordered road segment pairs actually defines the maneuver to be implemented along the desired route such that at node 32 it is clear that a vehicle guidance instruction indicating a left turn should be generated. The term "ordered road segment pair" is distinguished from the term "road segment" which refers to a specific road path which exists between two nodes, or road intersection points, such as the nodes 31 and 32 or the nodes 32 and 33.

According to the preferred operation of the apparatus 10 shown in FIG. 1, in response to the generation of a can't do/reroute command, the navigation computer will automatically, without any further identification instruction from the vehicle driver, identify either an ordered road segment pair, or vehicle maneuver, or a next road segment in the route which should be excluded from a new route to be planned to the desired destination. This feature apparently is not implemented by any prior navigation system and prevents the new calculated route from implementing a circular path for vehicle travel which could continually bring the vehicle back to an undesired or impassible road segment or maneuver. This can be best illustrated by referring to FIG. 4.

FIG. 4 illustrates a road network 50 upon which is shown initial vehicle travel by virtue of an arrow 51. A final destination of the vehicle is indicated by a location 52, and a blockage of a road segment is illustrated by a bar 53. An initial route (shown solid in FIG. 4) for a vehicle to reach destination 52 includes an order road segment pair comprising a road segment 55 followed by a road segment 59. The vehicle will travel in the direction of arrow 51 through a node 54 and onto the road segment 55 up till it reaches a node 56. At this time, the vehicle operator will realize that he cannot proceed directly ahead because of the blockage 53, even though the planned initial route instructs him to continue ahead to the destination 52 which is on the right side of segment 59. Instead, the vehicle driver will take the only opportunity open to him which is to implement a right turn and proceed toward a node 57. In some prior vehicle navigation systems, such as the "Carin" system by Philips, when the vehicle goes off route the navigation computer will automatically plan a new fastest or shortest distance route to the same destination. As shown in FIG. 4, this prior art new route (shown dashed) will involve routing the vehicle through the node 57 to node 58, and then to node 54 and again to node 56. This path represents the prior system optimal solution based on minimizing travel time and/or distance for a new route. However, as can be seen from FIG. 4, this involves a circular rerouting of the vehicle and will never result in the vehicle achieving its final destination location 52. Other prior navigation systems which were faced with the same road situation, either would just provide the vehicle operator with a map of the area or would require the vehicle operator to specifically identify as a detour a road segment he did not wish to travel on. Either of those two alternatives might require extensive attention of the vehicle driver and interrupt his travel progress.

The navigation apparatus 10 avoids the situations discussed above this by having the vehicle driver, either before or after implementing a right turn at the node 56, manually depress the can't do/reroute push button. This push button generates a reroute or can't do command which automatically has the navigation computer not only compute a new route to the destination, but also exclude from this new route either a road segment or maneuver so that the driver is sure that the new route will not include the same undesirable or unsuitable road segment or maneuver contained in the first or initial route. Thus, the navigation apparatus 10 in FIG. 1, in response to the generation of a can't do/reroute command, will plan a new route to the location 52 which preferably will avoid the "continue straight" maneuver of the previous route requested at the node 56. This "continue straight" maneuver is defined by the ordered road segment pair in FIG. 4 comprising the segment 55 followed by the segment 59. Instead, the new route (shown dotted) calculated by the navigation apparatus 10 will include road segments 60, 61 and 62 followed by the road segment 59 in that order.

If the new route provided by the computer 11 is planned while the vehicle is still on road segment 55, the new route will include the ordered road segment pair 55–60. If the new route is planned while the vehicle is on road segment 60, it will just comprise the ordered road segment pairs 60–61, 61–62 and 62-59. In any event, the undesirable, impossible or unsuitable maneuver represented by the road segment pair 55–59 is avoided in the new route by the present navigation apparatus 10. The manner in which this is achieved will now be discussed in connection with the detailed flow charts shown in FIGS. 5 and 6.

It should be noted that while the present apparatus 10 contemplates the use of manual actuation of push button 19 to generate the can't do/reroute command, this command could be implemented by the microphone 16 and subsequent voice recognition circuitry within the computer 11 to identify the driver as issuing a can't do or reroute command. Also, it should be noted that an ordered road segment pair as utilized herein defines one of at least two unique paths through a node corresponding to a roadway intersection. Thus when an ordered road segment pair is designated as being excluded, what is intended is that one of the at least two unique paths through a roadway intersection is excluded, therefore still leaving an alternative path through that node.

In some instances, rather than excluding an ordered road segment pair corresponding to a maneuver, it may be desirable to exclude an entire road segment. To distinguish this from excluding a road segment pair, the vehicle operator could manually depress the can't do button twice within a short time duration to indicate that he desires a different mode of exclusion. Depressing the can't do button only once would indicate the exclusion of the ordered road segment pair or maneuver. This further refinement to the apparatus shown in FIG. 10 can be readily implemented and allows the implementation of either of the flowcharts shown in FIGS. 5 and 6 depending on what type of can't do/reroute command was generated. The can't do/reroute command corresponds to one logic state of multiple state control signal generated in response to actuation of the push button 19.

Referring now to FIG. 5, a reroute flowchart 70 is illustrated which illustrates a preferred mode of operation for the navigation computer 11. The flowchart 70 implements the reroute calculation routine corresponding to the process implemented by the block 27 in FIG. 2. After an initial entry step 71, a decision block 72 inquires if the navigation computer 11 is in a guidance mode during which it provides guidance instructions to the vehicle driver to implement a preplanned route. If not, a process block 73 explains to vehicle driver the proper use of the reroute button and then a step 74 cancels the process flow. In other words, if the can't do/reroute button is depressed but the navigation computer 11 isn't in a mode during which guidance instructions may be provided to the driver, then there is no prior route which is to be recalculated and the assumption is that the can't do/reroute button was actuated by error.

If decision block 72 determines that the navigation computer 11 is in its guidance mode for providing guidance instructions to the driver, a decision block 75 inquires if the vehicle is still on its preplanned route. If not, a process block 76 will effectively identify and raise the impedance on the "previous" ordered road segment pair (OSP) contained on the route. By "previous" ordered road segment pair what is meant is the last (or next) ordered road segment pair of the previous route which has not yet been fully executed by vehicle travel. Subsequently, a process block 77 will predict the future position of the vehicle at a subsequent time based on the vehicle's current speed and heading and its current position. Then, a process block 78 will calculate a new route to the same desired destination as the previous route, but from the predicted vehicle position.

It should be noted that the process block 78 calculates the new route after the impedance on the identified previous ordered road segment pair of the prior route has been raised. Raising the impedance of the previous ordered road segment pair will effectively prevent this ordered road segment pair from being selected for the new route as planned by the process block 78. Thus the new route provided as an output by the process block 78 will exclude the identified previous ordered road segment pair and provide a new route to the desired destination.

After process block 78, a process block 79 corresponds to the navigation computer 11 now providing the first new route guidance instruction such that the vehicle driver will implement the new route to the desired destination. Then the routine 70 ends at a step 80 which results in returning the flow of control to the terminal 24 in FIG. 2 such that additional route guidance instructions will be provided for the new route until the destination is arrived at.

As described above, the vehicle navigation apparatus 10 has provided a reroute (or next route) means for automatically, in response to the can't do/reroute signal created by the vehicle driver, identifying for exclusion at least one maneuver of the prior or initial route. This one maneuver would correspond to the previous (next) ordered road segment pair which had not yet been traversed by the vehicle as part of the prior route. After identifying this maneuver corresponding to the ordered pair, the impedance of this maneuver or ordered road segment pair is raised so as to exclude it from consideration in a subsequent route calculation to be implemented by the computer. Thus when process block 78 calculates a new route to the same destination as the initial route, this new route will exclude from it the identified maneuver or ordered road segment pair. The process blocks 79 and 25 will then provide user guidance instructions to enable the vehicle to traverse the new route to the destination until the destination is arrived at or until a second can't do/reroute command signal is generated.

A significant feature of the apparatus 10 is its providing of a new route at a subsequent time based on the predicted future position of the vehicle calculated in accordance with the vehicle's present position and the vehicle's current speed and heading. This is implemented by the process blocks 77 and 78 with process block 77 predicting the future location of the vehicle and process block 78 calculating the new route based on this predicted position. In prior systems, it is believed that route calculations were made based on the vehicle's current position without regard to if the vehicle was moving or not. The problem with such a prior system would be that by the time the route calculations had finished, the vehicle may have already passed by the location of a desired maneuver to be implemented in the newly calculated route. The navigation apparatus 10 avoids such a problem by providing the process blocks 77 and 78 and other similar process blocks.

The above stated description of flowchart 70 covers the situation when the vehicle is no longer on the original route and a reroute command or signal has been generated by the vehicle driver indicating the undesirability or unsuitability of following the original route guidance instructions provided by the computer 11. If the process block 75 determines that the vehicle is still on route when a reroute command has been generated, control passes from the decision block 75 to a decision block 81 which inquires if the vehicle is moving. If so, control passes to a process block 82 that raises the impedance of the current ordered road segment pair which is part of the prior route. By "current ordered road segment pair" what is meant is the next ordered road segment pair which is to be implemented by the vehicle as per the originally planned route. This means the maneuver between the road segment on which the vehicle is currently located and the next road segment of the original route to be traversed. The difference between process blocks 76 and 82 is minor in that both still refer to the uncompleted or next maneuver as defined by an ordered road segment pair. However, the wording of block 76 denotes that now the vehicle is off route and therefore can't immediately complete the prior ordered road segment pair, whereas the wording of block 82 recognizes that the vehicle is still on route and therefore could complete the next or current ordered road segment pair.

It should be noted that by raising the "impedance" of an ordered road segment pair what is intended is that the route criteria used by the computer to select a route, such as a criteria for optimum time or shortest distance, is altered for the ordered road segment pair so as to exclude the ordered road segment pair whose impedance has been raised. Also, by excluding an ordered road segment pair it should be noted that this does not exclude any of the individual road segments, but only the specific designated sequence of road segments that defines an order road segment pair. For example, excluding the ordered road segment pair 55 and 59 in FIG. 4 would not result in excluding all subsequent travel on either the segment 55 or the segment 59 for any subsequent route. All that it would exclude is the specific combination of road segment 55 followed immediately by the road segment 59.

Referring back again to FIG. 5, since block 81 determined that the vehicle is moving, after block 82 a process block 83 is entered which predicts the future position of the vehicle based on its present position, speed and heading. Then again block 78 will calculate a new route from this predicted vehicle position to the desired destination.

If the vehicle is not moving per decision block 81, then a decision block 84 inquires if the current position of the vehicle, which is now stopped, is near the end of the specific road segment on which it is located. Remember that block 75 has ensured that this road segment is still part of the initial planned route to the destination. If the vehicle is near the end of this segment, then it will be presumed that the thing to be excluded from the new route is just the specific maneuver which is part of the prior route. Thus from block 84 control passes to a process block 85, that is identical to block 82, and that block raises the impedance of the current ordered road segment pair which is part of the initial route. From block 85 control passes to a process block 86 which calculates a new route based on the current vehicle position. It should be noted that the wording of this block is somewhat different from block 78, but that is because the vehicle is now stopped according to block 81 and thus there is no need to predict a future position of the vehicle for block 86. After block 86, control again passes to the process block 79 for generation of the first instruction for the new route.

If process block 84 determines that the vehicle is not near the end of the current road segment on which it is located, control passes to a decision block 87 which inquires if a U-turn is possible on the road segment on which the vehicle is located. If a U-turn is not possible, then a process block 88 informs the driver that there is no alternative route. In this situation, basically the system has indicated that you are not anywhere near the end of the road segment on which you are traveling and therefore you are not near any possible turn-off for this road segment. The system also has determined that you cannot make a U-turn on this road segment. Therefore you can't go anywhere and there is no way to plan a new alternative route from your current position. This is the impact of blocks 87 and 88 taken together.

If decision block 87 determines that a U-turn is possible, then control passes to a process block 89 which raises the impedance on "all forward ordered road segment pairs" which include the current road segment on which the vehicle is located. By "all forward ordered road segment pairs" what is meant is raising the impedance on every possible turn associated with the next road intersection or node toward which the vehicle is currently heading on its current road segment. By raising the impedance on all of these forward ordered road segment pairs, and by recognizing that a U-turn is possible, this will result in the subsequent process block 86 instructing the vehicle driver to make a U-turn and proceed in the opposite direction as his first instruction for the new route.

FIG. 5 has been described in terms of identifying for exclusion an ordered road segment pair or maneuver of the vehicle that was part of an initially planned route to a desired destination. This is believed to be the most advantageous way of implementing rerouting according to the apparatus 10 shown in FIG. 1. However, some prior systems may implement a similar rerouting by excluding an entire road segment rather than just an ordered road segment pair or maneuver. FIG. 6 illustrates a flowchart 90 which operates in this fashion and this will now be explained in detail.

Since a large number of the process and decision blocks in the flowchart 90 in FIG. 6 are identical to those in flowchart 70, the same reference numerals used in FIG. 5 are used in FIG. 6 for identifying corresponding identical blocks. Essentially, the only difference between the flowcharts 90 and 70 is that the process blocks 76, 82, 85 and 89 in the flowchart 70 have been replaced in FIG. 6 by corresponding process blocks 76', 82', 85' and 89', respectively. Process block 76' now states that if the vehicle is off route as determined by block 75, it will raise the impedance of the successor (next) road segment which is part of the initial route. This results in excluding a specific road segment from utilization in the new route to be calculated by block 78. Similarly, process blocks 82' and 85' have identical wording to the block 76' in which case the successor road segment of the previous route is excluded. The wording of process block 89' now recites that it will raise the impedance on all forward successor road segments to the current road segment on which the vehicle is located. This means that the new route will have eliminated from it all road segments which intersect the node towards which the vehicle is heading on the specific road segment on which it is located. The impact of this is again to require the new calculated route to provide a U-turn instruction because further proceeding along the current road segment cannot be used to arrive at the desired destination.

While I have shown and described specific embodiments of this invention, further modifications and improvements will occur to those skilled in the art. All such modifications which retain the base underlying principles disclosed and claimed herein are within the scope of this invention.

We claim:

1. Vehicle navigation apparatus, comprising:

initial route means for calculating for a vehicle an initial route to a desired destination, said initial route comprising an ordered connected plurality of road segments selected from road segments defined in a road map database, said road segments in said initial route ordered so as to define a plurality of vehicle maneuvers for traveling from one road segment in said initial route to a connected road segment in said initial route;

means for providing sequential initial route guidance instructions in accordance with said initial route to enable said vehicle to traverse said initial route;

means for providing a user initiated can't do-reroute signal indicative of a vehicle user determining unsuitability of following said initial route guidance instructions;

new route means for automatically, in response to said can't do-reroute signal, identifying for exclusion at least one of said maneuvers between road segments in said initial route, and then calculating a new route to said destination, via said road segments in said road map data base, by excluding from said new route said at least one identified maneuver without excluding from consideration any individual read segments in said initial route; and means for providing new route guidance instructions to enable said vehicle to traverse said new route to said destination.

2. Vehicle navigation apparatus according to claim 1 wherein said can't do-reroute signal corresponds to one logic state of a multiple state control signal.

3. Vehicle navigation apparatus according to claim 2 wherein said can't do-reroute signal providing means comprises a push button, actuation of which will create said can't do-reroute signal.

4. Vehicle navigation apparatus according to claim 3 wherein single manual actuation of said push button creates said can't do-reroute signal.

5. Vehicle navigation apparatus according to claim 4 wherein said road map data base road segments are stored in a memory device accessed by said initial route and new route means.

6. Vehicle navigation apparatus according to claim 1 wherein said new route means includes means for providing as said identified maneuver for exclusion the next maneuver to be implemented in said initial route.

7. Vehicle navigation apparatus according to claim 6 wherein said new route means includes means for determining if said vehicle is off said initial route, and, if so, providing as said identified maneuver for exclusion the next maneuver which was to have been implemented in said initial route.

8. Vehicle navigation apparatus according to claim 6 wherein said new route means includes means for determining if said vehicle is currently on said initial route and determining if said vehicle is currently moving, said vehicle on route and vehicle moving determinations both being utilized in determining which maneuvers should be excluded from said new route.

9. Vehicle navigation apparatus according to claim 1 wherein said new route means includes means for determining if said vehicle is on said initial route and if current position of said vehicle is near the end of a road segment on which the vehicle is currently located, said on route and said current position determinations being selectively utilized for determining said maneuvers to be excluded from said new route.

10. Vehicle navigation apparatus according to claim 1 wherein said new route means includes means for determining if a U-turn is possible on the current road segment on which the vehicle is located on, said U-turn determination being selectively utilized for determining maneuvers to be excluded from said new route.

11. Vehicle navigation apparatus according to claim 1 wherein said new route means includes means for determining if said vehicle is currently on route, if said vehicle is currently moving, if said vehicle is near the end of a road segment on which the vehicle is currently located, and if a U-turn is permissible on said road segment on which said vehicle is currently located on, said new route means selectively, in accordance with the preceding determinations, identifying for exclusion all forward maneuvers implementable at the end of the current road segment on which the vehicle is located, thus ensuring that the new route will begin with a U-turn on the segment that the vehicle is currently located on.

12. Vehicle navigation apparatus according to claim 1 wherein at least one of said initial route and new route means includes means for providing a calculated route at a subsequent time by calculating the route based on a predicted position of the vehicle at a subsequent time based on the vehicle's current position, direction and rate of travel.

13. Vehicle navigation apparatus, comprising:

initial route means for calculating for a vehicle an initial route to a desired destination, said initial route comprising an ordered connected plurality of road segments selected from road segments defined in road map data base;

means for providing sequential initial route guidance instructions in accordance with said initial route to enable said vehicle to traverse said initial route;

means for providing a user initiated can't do-reroute signal indicative of a vehicle user determining unsuitability of following said initial route guidance instructions;

new route means for automatically, in response to said can't do-reroute signal, identifying for exclusion at least one ordered road segment pair in said initial route, said at least one identified ordered road segment pair including at least the next ordered road segment pair in said initial route to be traversed by said vehicle, and then calculating a new route to said destination, via said road segments in said road map data base, by excluding from said new route said at least one identified ordered road segment pair without excluding from consideration any individual road segments in said initial route; and means for providing new route guidance instructions to enable said vehicle to traverse said new route to said destination.

14. Vehicle navigation apparatus according to claim 13 wherein said can't do-reroute signal corresponds to one logic state of a multiple state control signal.

15. Vehicle navigation apparatus according to claim 14 wherein said can't do-reroute signal providing means comprises a push button, actuation of which will create said can't do-reroute signal.

16. Vehicle navigation apparatus according to claim 13 wherein said new route means includes means for determining if said vehicle is off said initial route, and, if so, providing as said identified ordered road segment pair for exclusion the next ordered road segment pair which was to have been implemented in said initial route.

17. Vehicle navigation apparatus according to claim 13 wherein said new route means includes means for determining if a U-turn is possible on the current road segment on which the vehicle is located on, said U-turn determination being selectively utilized for determining ordered road segment pairs to be excluded from said new route.

* * * * *